No. 855,780. PATENTED JUNE 4, 1907.
H. L. HOOKE.
DEVICE FOR CONTROLLING MOTOR CARS.
APPLICATION FILED FEB. 18, 1907.
3 SHEETS—SHEET 1.
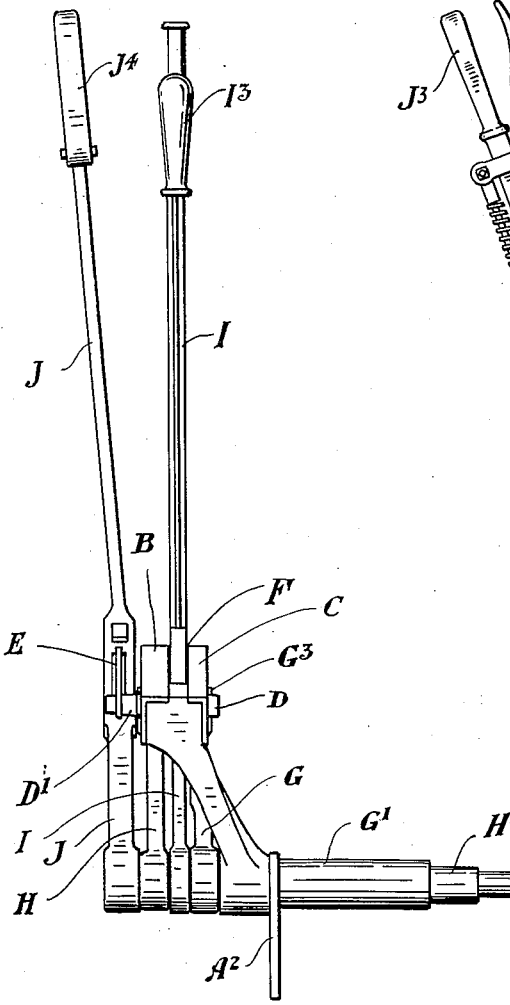
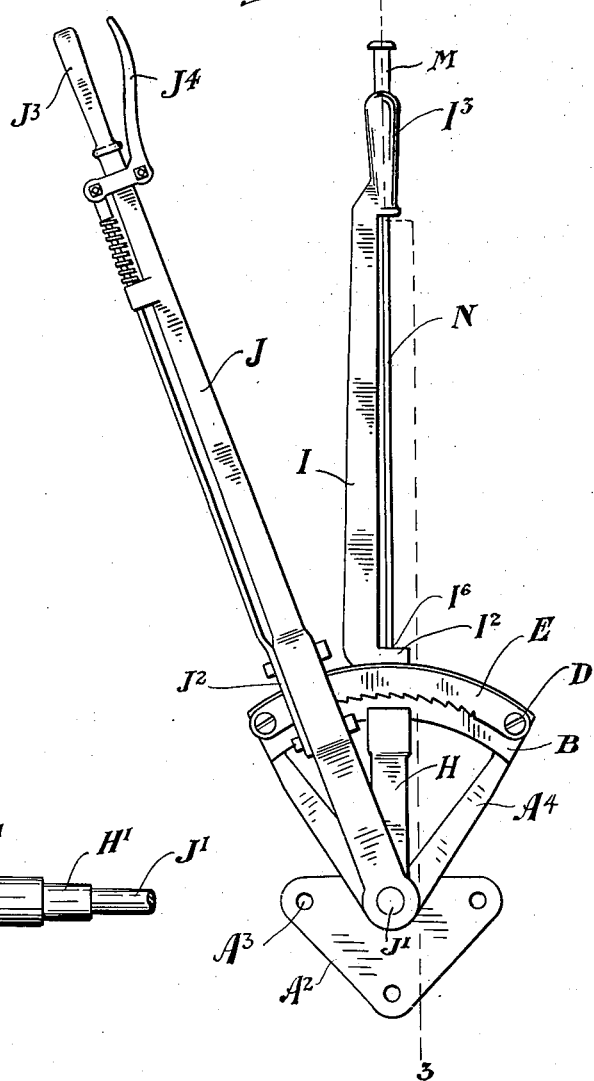
WITNESSES:
INVENTOR
Harvey L. Hooke,
BY
Thomas L. Ryan
ATTORNEY

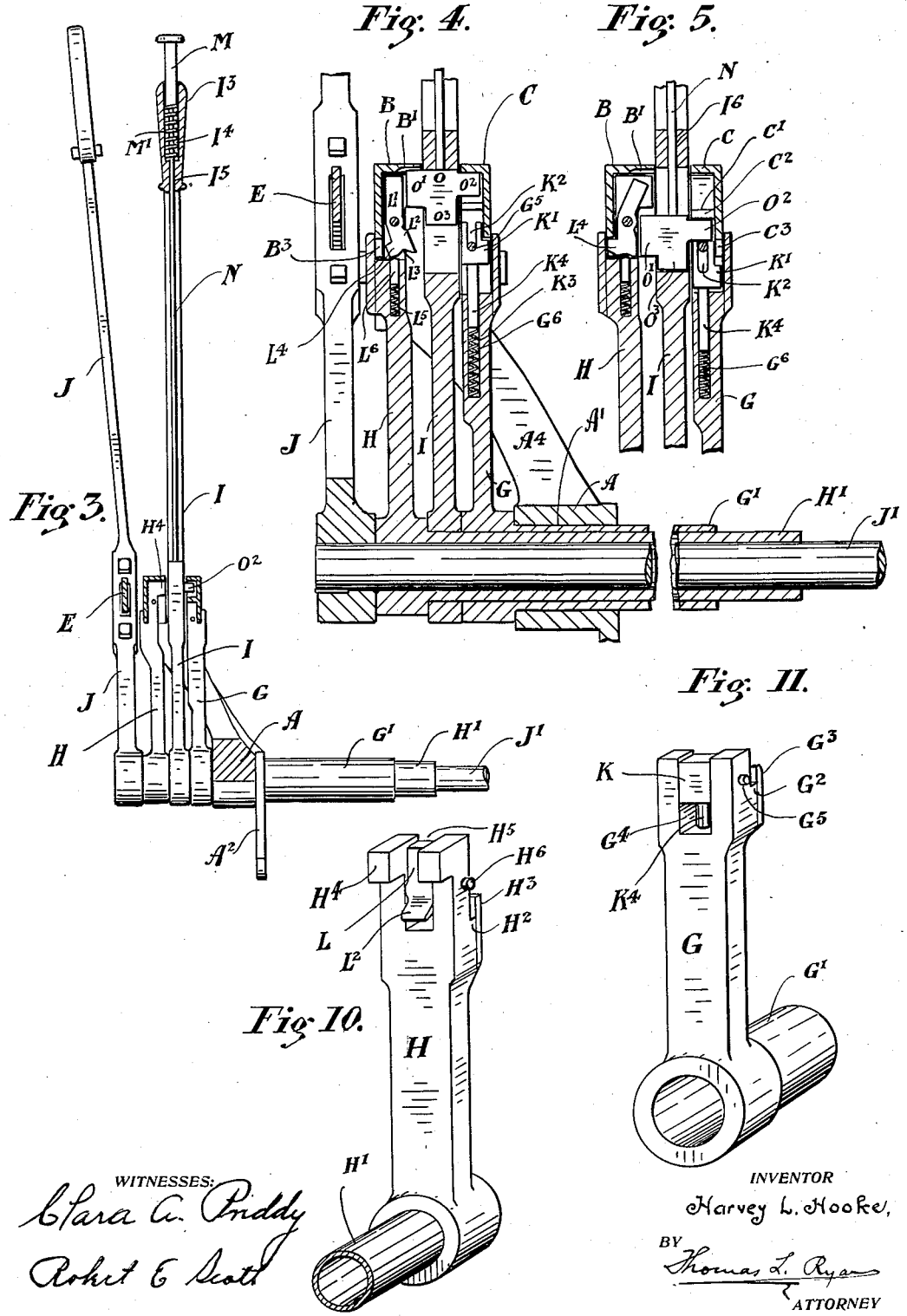

No. 855,780. PATENTED JUNE 4, 1907.
H. L. HOOKE.
DEVICE FOR CONTROLLING MOTOR CARS.
APPLICATION FILED FEB. 18, 1907.
3 SHEETS—SHEET 3.
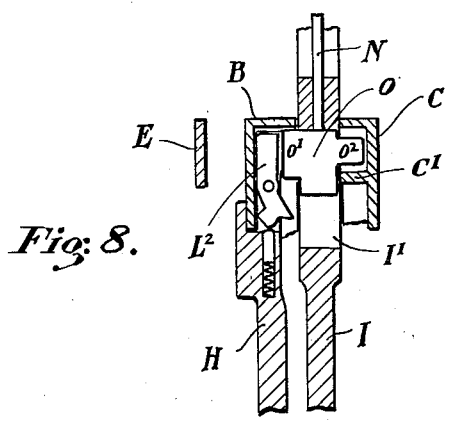
Fig. 8.
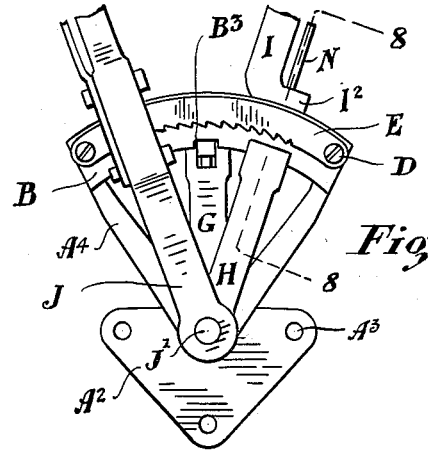
Fig. 6.
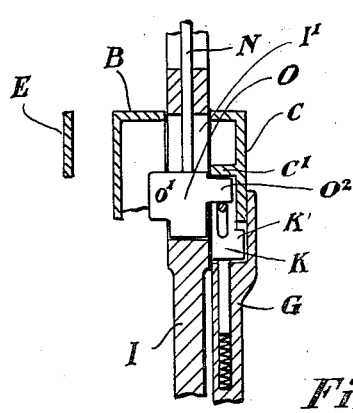
Fig. 9.
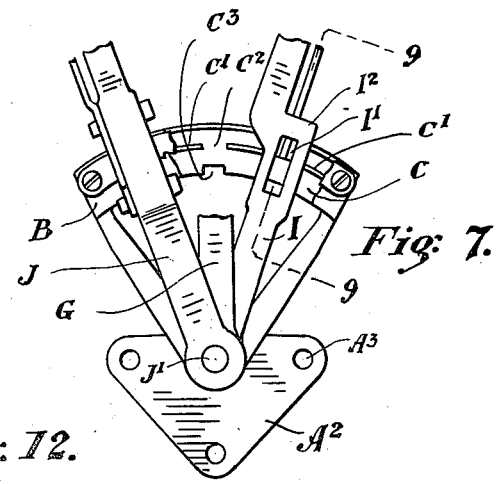
Fig. 7.
Fig. 12.
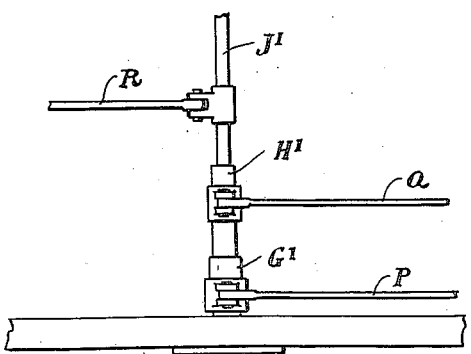
WITNESSES:
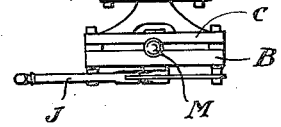
INVENTOR
Harvey L. Hooke,
BY
Thomas L. Ryan
ATTORNEY

UNITED STATES PATENT OFFICE.

HARVEY L. HOOKE, OF MUNCIE, INDIANA, ASSIGNOR TO MUNCIE AUTO PARTS COMPANY, OF MUNCIE, INDIANA, A CORPORATION.

DEVICE FOR CONTROLLING MOTOR-CARS.

No. 855,780.      Specification of Letters Patent.      Patented June 4, 1907.

Application filed February 18, 1907. Serial No. 358,041.

*To all whom it may concern:*

Be it known that I, HARVEY L. HOOKE, a citizen of the United States, and a resident of Muncie, in the county of Delaware and State of Indiana, have invented a new and useful Device for Controlling Motor-Cars, of which the following is a specification.

This invention has reference to devices for controlling the speed and the direction of movement, forward or rearward, of motor-cars.

The invention is shown herein embodied in a device for controlling, in motor-cars, the mechanisms transmitting the motive power therein to the traction mechanisms. In motor-cars of the preferred type the gearing is so arranged that three differential speeds of the car forwardly, and the reversal of the direction of movement of the car, may be accomplished.

The features of this invention consist essentially of a control-lever pivotally mounted so that it may be oscillated between oppositely positioned sector-plates, the latter being supported by a suitable frame to be secured to the frame-work of the motor-car; and two cranks having hollow shafts for connection to the transmission devices, and hand-controlled means contained in the control-lever adapted to co-act with devices in the said cranks whereby, with the actuation of the means in the control-lever and then the oscillation of the control-lever predeterminately to a forward or rearward position, a transmission of the motive power of the car to any one of the sets of speed gears desired, or to the reverse gear, may be expeditiously and positively accomplished; and whereby the crank that is in engagement with the transmission not in actual engagement is automatically locked securely in inoperative position.

Another feature of the invention is the novel combination with the devices referred to of a shaft which is adapted to be connected to the emergency brake mechanism of the car, journaled to the said sector-frame, the lever for the oscillation of this shaft being secured directly to it, and retaining means therefor secured to and made a part of the said sector-frame.

The object of this invention is to provide a device to accomplish the engagement or disengagement of either of the differential speed-gears for driving the car forward, or for reversing the movement of the car, and to provide such device so improved in arrangement, conformation and construction of its parts that it will be neat and of good appearance, compact, of few parts, and not liable to get out of adjustment or repair, and which may be exceedingly simple and easy of manipulation.

A further object is to combine therewith an emergency brake mechanism in such manner that the levers of the two mechanisms may be oscillated upon the same center and supported by the same sector-frame.

The objects of my invention are accomplished by the novel and ingenious mechanism described in this specification, illustrated in the accompanying drawings, and designated in the appended claims.

In the drawings, similar characters of reference refer to corresponding parts throughout the several views, in which—

Figure 1 is a front view, and Fig. 2 is a side view of my newly invented device complete, the control-lever being set in neutral position. Fig. 3 is a transverse sectional view taken on the line 3—3 Fig. 1. Fig. 4 is an enlarged central transverse sectional view of the invention as shown in Fig. 1, the extended portions of the levers and the frame-plate being broken away, and the shafts being broken into. Fig. 5 is a detached enlarged central transverse sectional view of the heads of the control-cranks and the main portion of the control-lever, as the same are shown in Fig. 1, the control-lever being in engagement with the control-crank G, the plunger in the control-lever having been depressed its full stroke. Fig. 6 is a front view of the device, the extended portions of the levers having been broken away, the control-lever being in engagement with the control-crank H, and shifted from neutral position. Fig. 7 is a front view of the device, the extended portions of the levers having been broken away, the control-lever being in engagement with the control crank G, and shifted from neutral position, a part of the sector-plate B, and the head of the control-crank H having been broken away. Fig. 8 is a detached enlarged transverse sectional view taken on the line 8—8 Fig. 6, and Fig. 9 is a transverse sectional view taken on the line 9—9 Fig. 7. Fig. 10 and Fig. 11 are detached enlarged perspective views of the control-cranks H and G, respectively, the extended portions of the hollow shafts H¹ and G¹ having been broken away. Fig. 12 is a top plan view showing the device in position with reference to the motor-car frame, and connected with working parts of the car which engage the gearing mechanism to be controlled.

The frame of my improved device is composed of the body-portion A having a transverse aperture A¹ therethrough and the plate A² formed integral therewith provided with the holes A³ through which suitable bolts are passed to secure the frame to the motor-car; formed integral with the body-portion A and disposed with their ends apart and in accurate position are the arms A⁴ finished on their ends to receive on their front and rear sides, the sector-plates B and C which are rigidly secured in position by the bolts D. Immediately back of the frontal heads of the bolts D is the curvilinear rack-bar E retained parallel to and a proper distance apart from the sector-plate B, by the rings D¹.

The sector-plates B and C are provided with suitable horizontal flanges of proper width so that the continuous slot F is formed, in which slot the control-lever I may be freely oscillated. In the under-side of the flange of the sector-plate B at a point equidistant from its ends, is the transverse recess B¹ the function of which will be presently disclosed. Formed integrally with the vertical portion of the sector-plate C and extending concentrically with the flange thereof, is the ledge C¹ its continuity being broken by the opening C² at a point equidistant from its ends. At the central point longitudinally of the lower edges of each of the sector-plates are the angular recesses B³ and C³, as plainly shown in Fig. 6 and Fig. 7.

Referring to Fig. 4; G and H designate control-cranks, having the hollow shafts G¹ and H¹ respectively, formed integral therewith, of suitable lengths to receive on their extended portions suitable connections for the transmission devices to be actuated; the hollow shaft G¹ being journaled in the aperture A¹ and the hollow shaft H¹ being journaled in the hollow shaft G¹. These shafts are intended to be of proper lengths as may be desired. Journaled on the hollow shaft H¹ and retained between the cranks G and H, is the control-lever I which will be more fully described hereinafter. J designates the brake-lever secured to the shaft J¹ which is journaled within the hollow shaft H¹ and extended a proper length to receive suitable connections for the braking device to be controlled thereby. The construction and functions of these control-cranks and the control-lever may be readily understood by reference to Figs. 4, 5, 10 and 11 of the drawings. The control-crank G is of such length that in its oscillation, its head, which is disposed immediately beneath the ledge C¹, will pass freely thereunder; the outer face of this head is provided with the shoulder G² and the face plate G³ which engage the lower edge and outer face respectively of the sector-plate C and slidingly retain the head of this crank in correct transverse position. G⁴ designates a transverse slot in which is slidingly retained the detent K having the shoulder K¹ adapted to engage the recess C³. This detent K is provided with the slot K² which engages the pin G⁵ passed through and rigidly secured in the head of the crank. Extending downwardly a suitable depth in the body of the crank from the seat of the slot G⁴ is the well G⁶ in which resides the coil-spring K³. This slot K² is of such depth and the pin G⁵ is so positioned in the head of this crank that by the upward pressure of the coil-spring K³ against the end of the shank K⁴ the detent K is normally retained yieldingly in the position as shown in Fig. 4 and Fig. 11.

The control-crank H is of such length that in its oscillation, its head, which is disposed immediately beneath the flange of the sector-plate B will pass freely thereunder; the outer face of this head is provided with the shoulder H² and the face-plate H³ which engage the lower edge and outer face, respectively, of the sector-plate B, and slidingly retain the head of this crank in correct transverse position. It will be observed that the vertical line of the inner face of the head of this control-crank H is within the vertical line of the inner edge of the flange of the sector-plate B the distance measured by the transverse tongues H⁴ protruding from the inner face of the head of the crank.

H⁵ designates a transverse slot of proper depth and in which the pawl L snugly resides and is pivoted on the pin H⁶ passed through and rigidly secured in the head of this crank. This pawl has the shank L¹, the face L², the dent L³ and the nose L⁴, the functions of each of which parts will be presently disclosed. This pawl is yieldingly maintained in the position as shown in Fig. 5 by the pressure upwardly of the coil-spring L⁵ against the stub L⁶ which has its bearing in the dent L³ and is slidingly retained in a suitable well provided therefor. When this pawl L is in the position as shown in Fig. 4 it is so retained by the dog positioned in the control-lever to be presently described.

I designates the control-lever positioned between the control-cranks and journaled on the hollow-shaft H¹, and is of such width at its portion between the facing flanges of the sector-plates that it may oscillate freely in the guideway thus formed between the sector-plates. At its portion between these sector-plates is provided the rectangular slot I¹, as shown in Fig. 7 and Fig. 4 and Fig. 5, the function of which slot will be presently shown. Adjacent the portion I² immediately above this slot the body of the lever is continued in a line aside from the center, to a proper length where the handle $I^3$ is formed integral therewith, as plainly shown in Fig. 1. $I^4$ designates a well in this handle opening into the aperture $I^5$ of smaller diameter and which passes through the handle, as shown in Fig. 3; an aperture $I^6$ of similar size is provided in the portion $I^2$ of this lever. Residing in the well $I^4$ is the strong coil-spring $M^1$. The plunger M having a suitably finished flat head thereon, and of proper length, has the plunger-rod N rigidly secured in its bottom; this plunger-rod is slidingly retained in the apertures $I^5$ and $I^6$ and rigidly secured to its lower end is the dog O of such transverse width as to fit snugly yet slidingly the slot $I^1$. The distance from the upper edge of the dog O and the bottom edge of the plunger M is such that when the dog is in the position as shown in Fig. 4, there will be a proper vertical clearance between the head of the plunger M and the top of the handle $I^3$. This dog O is provided with the noses $O^1$ and $O^2$, adapted to occupy the slots $H^5$ and $G^4$ respectively, alternately, and also to engage the pawl L and the detent K, respectively, alternately. The foot $O^3$ is provided to lend stability thereto in the differential positions occupied by it, as shown in Fig. 4 and Fig. 5.

The brake-lever J rigidly secured to its shaft $J^1$, is extended in length as shown in Fig. 1 and at the enlarged portion is provided with a suitable slot which surrounds the ratchet-bar E.

$J^2$ designates the lock-bar which has a suitable slot therein to surround the ratchet-bar and to engage the ratchet-teeth on its under side; this lock-bar is slidingly secured in position by suitable means and is normally held in engagement with the ratchet-teeth and connected by the well known means illustrated, to the handle $J^3$ and the grip $J^4$, so that the lever may be locked in and unlocked from differential positions on the ratchet-bar.

In assembling the device, the shaft $G^1$ is inserted through the aperture $A^1$ of the frame, then the sector-plate C is placed in position with its lower edge in engagement with the head of the control-crank G, the control-lever is then placed in position and the shaft $H^1$ is then inserted therethrough and through the hollow shaft $G^1$, then the sector-plate B is placed in position with its lower edge in engagement with the head of the control-crank H. The shaft $J^1$ having the brake-lever secured thereto is then placed in position as shown in Fig. 4, the ratchet-bar E inserted through the slot therefor, and the bolts binding the sector-plates, the frame-arms and the ratchet-bar together, are placed in position, and when tightened, the device is complete, and in readiness to be applied to use, and appears as shown in Fig. 1.

To readily understand the description of the operation of my invention, reference may be had to Fig. 12 of the drawings, wherein the device is shown secured to a frame-member of a motor-car, connecting bars P and Q being shown as pivotally secured to cranks on the shafts $G^1$ and $H^1$ respectively, and which said connections engage the "medium and high-speed" gearing, (not shown), and the "slow and reverse" gearing (not shown), respectively, of the car. The connecting bar R, being shown as pivotally secured to a crank on the shaft $J^1$ is adapted to engage the braking-mechanism (not shown), of the car.

When the entire gearing of the car is out of engagement and my invention is not in action, the parts of the device, all, are in the positions as shown in Fig. 4; the dog O having its nose $O^1$ held firmly in engagement with the recess $B^1$, and occupying the slot $H^5$ of the control-crank H, and the detent K having its shoulder $K^1$ in engagement with the recess $C^3$ of the sector-plate C, the control-crank G being thereby locked. When it is desired to bring into action the "slow speed" gearing, the plunger is depressed slightly whereby the dog O is released from its engagement with the recess $B^1$ and the forward movement of the control-lever moves the control-crank H and shaft $H^1$; by the movement of the control-lever rearwardly it having in engagement, the crank H, the "reverse" gearing is brought into action. When it is desired to bring into action the "medium" speed gearing, the control-lever is brought to the neutral, or central position; the plunger is then depressed its full stroke whereby the nose $O^1$ of the dog leaves its position in the slot $H^5$ of the control-crank H and slidingly engages the face $L^2$ of the pawl and forces its nose $L^4$ directly into engagement with the recess $B^3$ of the sector-plate B, thereby locking in immovable position, the control-crank H; at the same time the nose $O^2$ has passed through the opening $C^2$, coming into occupancy of the slot $G^4$ of the control-crank G and disengaging the shoulder $K^1$ of the detent, from the recess $C^3$, thereby locking the control-crank G into engagement with the control-lever and unlocking it from the sector plate C; the hand of the operator is held on the plunger-head and the control-lever is moved forwardly from its neutral position. When it is desired to bring into action the "high-speed" gearing the control-lever (the plunger being held down to lowermost position, as the line of neutrality is passed) is thrown rearwardly.

What I claim as my invention, and desire to secure by Letters Patent is—

1. A device of the kind described, comprising a frame. curvilinear guide-bars angle-shaped in cross section secured thereon, the flange of one of said guide-bars having a recess at its central portion on its under side, the opposite guide-bar having a continuous ledge extending concentrically with the flange and apart from it and divided by an opening at its central portion, there being oppositely disposed recesses in the lower edge of each of the said guide bars, a pair of cranks having extended hollow-shafts of different lengths, the shaft of one being journaled in the shaft of the other, the larger shaft being journaled in the frame, a control-lever journaled on the common center of said shafts and between the said cranks and retained slidingly between the said guide-bars, spring-pressed devices in each of the said cranks to maintain the cranks yieldingly and in removable engagement with the control-lever and the guide-bars, a spring-pressed hand-controlled device carried by the control-lever to alternately engage the devices in the cranks to unlock one of the cranks from its engagement with the control-lever and to lock it into engagement with the frame, and to unlock the opposite crank from engagement with the frame, and to lock it into engagement with the control-lever.

2. A device of the kind described, comprising a frame, curvilinear guide-bars angle-shaped in cross section secured thereon, the flange of one of said guide-bars having a recess at its central portion on its under side, the opposite guide-bar having a continuous ledge extending concentrically with the flange and apart from it and divided by an opening at its central portion, there being oppositely disposed recesses in the lower edge of each of said guide-bars, a curvilinear ratchet-bar secured to the said frame apart from, parallel to, and concentrically with the guide-bars thereof, a pair of cranks having extended hollow-shafts of differential lengths, the shaft of one being journaled in the shaft of the other, the larger shaft being journaled in the frame, a brake-lever rigidly secured to a shaft that is journaled in the smaller hollow-shaft and having its end extended beyond the ends of said crank shafts, the said brake-lever having hand-controlled means thereon to hold said lever into and out of engagement with said ratchet-bar, a control-lever journaled on the common center of said shafts and between the said cranks and retained slidingly between the said guide-bars, spring-pressed devices in each of the said cranks to maintain the said cranks yieldingly and in removable engagement with the control-lever and the guide-bars, a spring-pressed hand-controlled device carried by the control-lever to alternately engage the devices in the crank to unlock one of the cranks from its engagement with the control lever and to lock it into engagement with the frame, and to unlock the opposite crank from engagement with the frame and to lock it into engagement with the control-lever.

3. In a device of the kind described, the combination of a frame, a pair of curvilinear guide-bars angle-shaped in cross section secured thereon, the flange on one of the said guide-bars having a recess at its central portion on its under-side, the opposite guide-bar having a continuous ledge extending concentrically with the flange and apart from it divided by an opening at its central portion, there being oppositely disposed recesses in the lower edge of each of the vertical walls of the guide-bars at their central portions, a crank G having a hollow-shaft $G^1$ integrally connected thereto and journaled in the frame, the head of said crank being bifurcated, a pin secured transversely therein and a slotted detent K having the shoulder $K^1$, slidingly positioned in the said head, a spring seated in the body of the crank to press the detent $K^1$ upwardly, a second crank H having a hollow shaft $H^1$ integrally connected thereto journaled in and of a length exceeding that of the shaft $G^1$, the head of said crank H being bifurcated and having the protrusions $H^4$ a pin secured transversely in the said head, a pawl pivotally sustained on said pin, a spring seated in the body of the crank to engage said pawl, a control-lever journaled on the common center of said shafts and between the said cranks and retained slidingly between the said guide-bars there being a slot in said lever at its portion between the guide-bars, the dog O with the noses $O^1$ and $O^2$ adapted to engage the said cranks H and G and to actuate the pawl and detent respectively, slidingly retained in said slot, a bar passing into the head of said control-lever connected to the dog and a spring to normally strain the dog toward the said head and against the guide-bars, substantially as described.

4. In a device of the kind described, the combination of a frame, a pair of curvilinear guide-bars angle-shaped in cross section secured thereon, the flange of one of the said guide-bars having a recess at its central portion on its under-side, the opposite guide-bar having a continuous ledge extending concentrically with the flange and apart from it, divided by an opening at its central portion, there being oppositely disposed recesses in the lower edge of each of the vertical walls of the guide bars at their central portions, a curvilinear ratchet-bar secured to the said frame apart from, parallel to and concentrically with the guide-bar thereof, a crank G having a hollow-shaft $G^1$ integrally connected thereto and journaled in the frame, the head of said crank being bifurcated, a pin secured transversely therein and a slotted detent K having the shoulder $K^1$, slidingly positioned in the said head, a spring seated in the body of the crank to press the detent $K^1$ upwardly, a second crank H having a hollow shaft $H^1$ integrally connected thereto journaled in and of a length exceeding that of the shaft $G^1$, the head of said crank H being bifurcated and having the protrusions $H^4$, a pin secured transversely in the said head a pawl pivotally sustained on said pin, a spring seated in the body of the crank to engage said pawl, a brake-lever rigidly secured to a shaft that is journaled in the smaller hollow-shaft and having its end extended beyond the ends of said crank shafts, the said brake-lever having hand-controlled means thereon to hold said lever into or out of engagement with the said ratchet-bar, a control-lever journaled on the common center of said shafts and between the cranks aforesaid and retained slidingly between the said guide-bars, there being a slot in said lever at its portion between the guide-bars, the dog O with the noses $O^1$ and $O^2$ adapted to engage the said cranks H and G and to actuate the pawl and detent respectively, slidingly retained in said slot, a bar passing into the head of said control-lever connected to the dog and a spring to normally strain the dog toward said head and against the guide-bars, substantially as described.

5. In a device of the kind described, the combination of a frame, a pair of curvilinear guide bars angle-shaped in cross section secured thereon, the flange of one of said guide-bars having a recess at its central portion on its under-side, the opposite guide-bar having a continuous ledge extending concentrically with the flange and apart from it and divided by an opening at its central portion, there being oppositely disposed recesses in the lower edge of each of said guide-bars, a pair of cranks having extended hollow-shafts of different lengths, the shaft of one being journaled in the shaft of the other, the larger shaft being journaled in the frame, oscillatory cranks being secured, respectively, to these hollow shafts, a control-lever journaled on the common center of said shafts and between said cranks and retained slidingly between the said guide-bars, spring-pressed devices in each of said cranks to maintain the cranks yieldingly and in removable engagement with the control-lever and the guide-bars, a spring-pressed hand-controlled device carried by the control-lever to alternately engage the devices in the cranks to unlock one of the cranks from its engagement with the control-lever and to lock it into engagement with the frame, and to unlock the opposite crank from engagement with the frame and to lock it into engagement with the control-lever, substantially as described.

6. In a device of the kind described, the combination of a frame, a pair of curvilinear guide-bars angle-shaped in cross section secured thereon, the flange of one of said guide-bars having a recess at its central portion on its under side, the opposite guide-bar having a continuous ledge extending concentrically with the flange and apart from it and divided by an opening at its central portion, there being oppositely disposed recesses in the lower edge of each of said guide-bars, a curvilinear ratchet-bar secured to the said frame apart from, parallel to and concentrically with the guide-bars thereof, a pair of cranks having extended hollow-shafts of different lengths, the shaft of one being journaled in the shaft of the other, the larger shaft being journaled in the frame, a brake-lever rigidly secured to a shaft that is journaled in the smaller hollow shaft and having its end extended beyond the ends of said crank shafts, the said brake-lever having hand-controlled means thereon to hold said lever into or out of engagement with said ratchet-bar, oscillatory cranks secured respectively to these hollow-shafts and the brake-lever shaft, a control-lever journaled on the common center of said shafts and between said cranks and retained slidingly between the said guide-bars, spring-pressed devices in each of said cranks to maintain the cranks yieldingly and in removable engagement with the control-lever and the guide-bars, a spring-pressed hand-controlled device carried by the control-lever to alternately engage the devices in the cranks to unlock one of the cranks from its engagement with the control-lever and to lock it into engagement with the frame, and to unlock the opposite crank from engagement with the frame and to lock it into engagement with the control-lever, substantially as described.

In testimony whereof I have hereunto signed my name to this specification in the presence of two subscribing witnesses.

HARVEY L. HOOKE.

Witnesses:
ARTHUR W. TYLER, Jr.,
THOMAS L. RYAN.